United States Patent
Doubler et al.

[11] Patent Number: 5,838,698
[45] Date of Patent: Nov. 17, 1998

[54] ALIGNMENT OF PARITY BITS TO ELIMINATE ERRORS IN SWITCHING FROM AN ACTIVE TO A STANDBY PROCESSING CIRCUIT

[75] Inventors: James Arthur Doubler, Wheaton; Michael Paul Hammer, La Grange Park, both of Ill.

[73] Assignee: Lucent Technologies Inc., Murray Hill, N.J.

[21] Appl. No.: 430,627

[22] Filed: Apr. 28, 1995

[51] Int. Cl.$^6$ ...................................................... H04L 5/24
[52] U.S. Cl. ........................... 371/49.1; 371/68.2; 364/187
[58] Field of Search ............................... 371/5.1, 48, 49.1, 371/49.2, 49.3, 49.4, 51.1, 68.2, 50.1, 67.1, 68.1, 69.1, 70; 370/13, 14, 16; 364/184–187

[56] References Cited

U.S. PATENT DOCUMENTS

| | | | |
|---|---|---|---|
| 4,543,651 | 9/1985 | Chang | 370/16 |
| 4,546,475 | 10/1985 | Sharpless et al. | 371/49 |
| 5,392,424 | 2/1995 | Cook | 371/49.1 |
| 5,406,563 | 4/1995 | Loebig | 371/5.1 |

*Primary Examiner*—Paul P. Gordon
*Assistant Examiner*—Thomas E. Brown
*Attorney, Agent, or Firm*—Charles L. Warren

[57] ABSTRACT

Glitchless switching between active and standby telecommunication apparatus having hierarchical nested parity bits is provided. A higher order parity bit is calculated based on defined data as well as a lower order parity bit. A method is provided for aligning each parity bit generated by a standby processor with a corresponding parity bit independently generated by an active processor. This alignment is accomplished prior to output frames of data being supplied by the standby processor in order to provide glitchless switching such that the first frame of data supplied by the standby processor contains parity bits which are in agreement with the corresponding data in the frame.

20 Claims, 3 Drawing Sheets

ALIGNMENT OF PARITY BITS TO ELIMINATE ERRORS IN SWITCHING FROM AN ACTIVE TO A STANDBY PROCESSING CIRCUIT

BACKGROUND OF THE INVENTION

This invention generally relates to a telecommunication network in which active and standby processing apparatus are utilized in the processing and transmission of data. This invention more specifically relates to the switching from the active to the passive apparatus when the data being handled by the apparatus includes hierarchical based parity bits.

It is common in a high reliability telecommunication network to provide two substantially identical processing apparatus used in processing and transmitting user data in the network. The pair of apparatus is typically referred to as an active and standby apparatus in which the active apparatus is engaged in processing and transmitting user data with the standby apparatus being idle but ready to assume responsibility for processing and transmitting the user data. A change of processing from the active to the standby apparatus enables the active apparatus to undergo maintenance and testing to ensure its continued reliability or may occur due to a failure of the active apparatus. It is, of course, desired that a switch over or transition from the active to standby apparatus handling the data transmission be accomplished with minimal, or preferably, no disruption of user data processed by the apparatus.

Various types of error detection techniques are utilized to detect errors in user data. The use of parity bits is well known in the art. A parity bit or a group of bits are generated by a calculation based on a collection of data to be protected. In a binary system, an even parity bit or an odd parity bit is determined based on whether the summation of a plurality of bits or bytes to be protected result in a number that is even or odd.

Data is often transmitted in frames in a telecommunication network wherein the frame is constructed to contain a payload or user data and a header which contains information utilized by the network in processing the frame of data. Since such frames may be constructed in a hierarchical manner to include and build upon previously constructed subframes (partial frames), such hierarchical constructed frames may result in the creation of hierarchical generated parity bits in which a first parity bit protects a first subframe, a second parity bit is based upon the first subframe plus additional information, and additional subframes are similarly built creating a hierarchy of subframes in which parity bits have a rank based on the hierarchy. The higher parity bits are based on subframe information and the parity bits of lower rank. Thus, the upper rank parity bits protect not only the data, but the integrity of the lower ranked parity bits.

While this technique provides increased reliability in detecting errors in the frame, such hierarchical parity bits present problems when the apparatus utilized to generate such a frame is desired to be switched from an active to a standby apparatus. This problem arises because the standby apparatus will normally not have been processing the previously generated frames of information at the time of the desired switch from the active to the standby apparatus. "Nested" parity bits are based on one or more prior frames in order to insure error protection over a series of such frames. The standby apparatus will not, upon the time of switch over from the active device, be capable of immediately generating the correct nested parity bits for the next frame to be transmitted. This occurs because the standby apparatus has not processed the prior frames of data which is required in order to determine the correct nested parity bits to be embedded in the first frame to be transmitted by the standby apparatus.

One approach to this problem is to disregard the history of the previously generated nested parity bits by the active apparatus and to begin transmission with a frame generated by the standby apparatus with a new series of parity bits. However, at least the first frame generated by the standby apparatus using this technique will result in parity bits which will appear to indicate erroneous associated data to the receiving equipment in the network (or end user equipment) which decodes the parity bits. Thus, this technique may result in the receiving equipment rejecting several frames of data as being erroneous. A request for the retransmission of such data may be made based on the perceived incorrect parity. In some system designs such a changeover operation may be acceptable. However, in systems where the requirement for the retransmission of a plurality of frames of data may represent unacceptable delays in the reception of correct data at the receiving equipment or in systems in which erroneous data may elicit undesirable maintenance activity, this technique may not prove acceptable. Thus, there exists a need for an improved technique for making the transition from an active to a standby apparatus in a telecommunication network where nested hierarchical parity bits are employed.

SUMMARY OF THE INVENTION

It is an object of the present invention to provide a solution to the above need and provide an inventive step in the art by providing for glitchless switching from active to standby apparatus in which hierarchical nested parity bits are generated. As used herein, "glitchless" switching refers to the ability to make an active-to-standby equipment changeover with no incorrect parity bits being transmitted.

In accordance with an embodiment of the present invention, a method is provided for permitting glitchless switching between active and standby telecommunication apparatus which generates hierarchical nested parity bits. In accordance with the illustrative embodiment, a third order hierarchical parity bit technique is accommodated by synchronizing frames to be transmitted by the standby apparatus to the proper parity bit conditions prior to the transfer from the active apparatus to the standby apparatus. In the exemplary embodiment, first, second, and third parity bits are utilized wherein the third parity bit protects a third subframe of data, a second parity bit protects a second subframe of data which includes the third subframe of data including the third parity bit, and the first (highest rank) parity bit resides in a first subframe and is also based on both the third and second subframes and hence, is based on both the third and second parity bits as well as the other included information.

Beginning with a first frame, the standby apparatus starts generating subframes and the nested parity bits. However, until the parity bits associated with the frames generated by the standby apparatus are aligned with the corresponding parity bits in frames generated by the active apparatus, the output frames transmitted to the network continue to be frames generated by the active apparatus. In the exemplary embodiment, three parity bits must be aligned to have the same polarity or state as the corresponding parity bits generated by the ongoing active apparatus. In accordance with the exemplary embodiment of the present invention, the decision of whether to invert each parity bit is sequentially made by order of the rank of the parity bit. For example, the lowest ranked parity bit (deepest embedded parity bit) is determined first, the next lowest parity bit determined next, and the highest order parity bit (rank N) determined last.

In accordance with an important recognition made in accordance with the present invention, it has been discovered that the previous inversion of a lower ranked parity bit will influence different parity alignment decisions. Thus, the history of lower ranked parity bit inversions is needed. Predetermined parity bit inversion sequences are stored for each of the possible decision branches which may be followed based on whether the corresponding ranked parity bits associated with the active and standby sides are equal and on whether a lower ranked parity bit has been previously inverted.

In accordance with the illustrative embodiment of the present invention, the standby apparatus aligns each of the three ranks of parity bits in a frame so that each equals the corresponding parity bit in the active side. Thus, after such processing, a transition can be made from the active to standby apparatus without incurring any perceived errors in data due to incorrect parity bits by equipment receiving the frames of data. This provides a glitchless switching capability.

DETAILED DESCRIPTION

Figure 1:
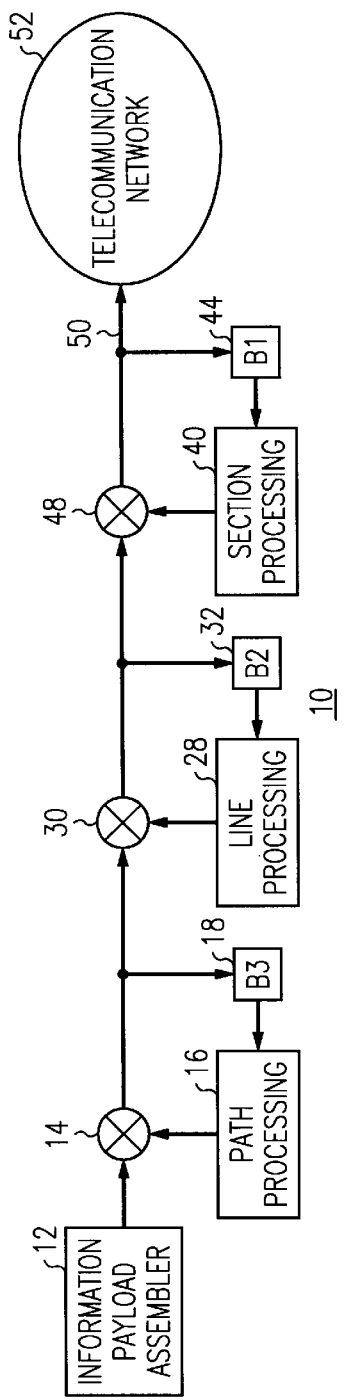
FIG. 1 illustrates a block diagram of an exemplary apparatus which generates frames of data which includes nested hierarchical parity bits.

FIG. 1 illustrates an exemplary multilevel processor 10 which generates frames of data including user information to be transmitted through a telecommunication network. The processor 10 includes a plurality of frame assembly stages which each add additional data and utilize parity bits calculated in a hierarchical nested technique to provide error protection. An information payload assembler 12 receives and assembles user data from either a single or a plurality of sources for transmission through the telecommunication network. A grouping of such user data is assembled in a known manner to form a payload on a frame-by-frame basis. The user data is combined as indicated by addition node 14 with additional information generated by path processing circuit 16. The path processing information includes information such as status, user identification, a parity bit, and other information which may be considered collectively as a first header. This information is combined with the assembled user data from assembler 12 by node 14. The output of node 14 (header 1 and payload 22) is read by a bit interleaved parity processor 18 which generates the lowest ranked parity bit (B3) in the exemplary embodiment. This parity bit is transmitted to the data processing circuit 16 for inclusion with the next generated frame of data generated by node 14. Each frame (actually a subframe) generated by node 14 carries a parity bit which was determined based upon the data contained in the preceding frame (subframe).

Figure 2:
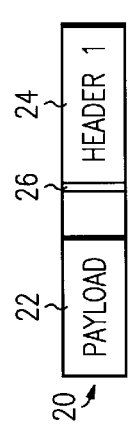
FIGS. 2, 3, and 4 illustrate a first, second, and final frame formats, respectively, for information processed by the apparatus as shown in FIG. 1.

Referring to FIG. 2, the data format of the subframe 20 generated as an output from node 14 includes a payload 22 consisting of the assembled user data by assembler 12, and header 24 generated by path processing circuit 16. In the exemplary embodiment, a bit interleaved parity byte 26 comprises part of header 24 and is generated by parity generator 18. In the illustrative embodiment, an 8-bit parity byte 26 is included in which each of the eight bits corresponds to the parity of the corresponding bits carried by 8-bit bytes of payload 22 and header 24. For example, the first bit of the 8-bit parity byte 26 consists of a bit defining an even or odd parity based on the addition of the corresponding first bits of all the other bytes associated with a subframe 20. Each of the successive bits 2–8 of the parity byte corresponds to an even and odd parity for the corresponding bits 2–8 of all the other bytes carried in the subframe 20. It will be apparent to those skilled in the art that the specific parity protection may vary, based on the grouping of bits and bytes to be protected by corresponding parity bits and bytes.

Returning to FIG. 1, a line processing circuit 28 provides additional information including a second priority byte to form what may be considered as second header which is attached to subframe 20 by addition node 30. A second bit interleaved parity byte (B2) is generated by parity generator 32 and inserted by the line processing circuit 28 during the generation of each frame (subframe).

Figure 3:
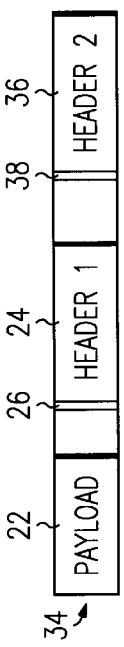

FIG. 3 illustrates the data format of a subframe 34 as output from node 30. As will be apparent, this subframe includes all the information contained by subframe 20 and further includes additional information contained in a second header 36 including a second 8-bit parity byte 38. The parity byte 38 is constructed similarly to that previously explained with regard to parity byte 26 in that each of the 8 bits comprises even and odd error protection of the corresponding bits in the bytes contained in subframe 34. However, parity byte 38 also provides error protection of the previously generated parity byte 26 and thus, parity byte 38 will vary in accordance with changes in the preceding parity byte 26 as well as changes of other data bytes in subframe 34. Also, as explained with regard to parity byte 26, the parity byte 38 included in one subframe is calculated based upon the data contained in the preceding subframe 34 transmitted from node 30. It will be apparent to those skilled in the art that the illustrative parity bytes will be received and stored by the end receiving equipment wherein the appropriate parity bytes will be applied to the data of the previous frame in order to permit an error detection calculation to be made by known parity calculation techniques.

Returning to FIG. 1, the subframe 34 is combined with additional information which may be considered as a third header generated by section processing circuitry 40 which is added to subframe 34 by node 48. The information included in the third header includes a final (highest order) parity byte (B1) generated by bit interleaved parity generating circuit 44. The frame has additional information generated by section processing circuitry which forms part of the third header. A final resulting frame 54 is transmitted on transmission channel 50 and is routed to telecommunication network 52. In accordance with the exemplary embodiment, the generation of sequential frames of data is provided by the multilevel processor 10.

Figure 4:
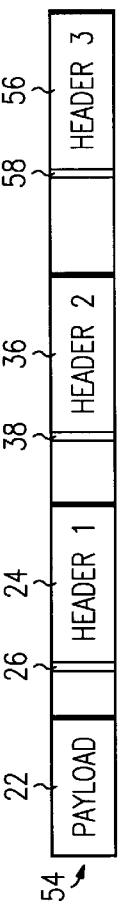

FIG. 4 illustrates the data format of the final (complete) frame 54 to be transmitted on channel 50. Frame 54 includes subframe 34 together with a third header 56 which includes a first (highest) rank parity byte 58. Like the previously explained generation of the lower ranked parity bits, the generation of parity byte 58 is based on the previously generated frame and includes error protection of all information contained in the last frame 54 including the parity bytes 26 and 38. A change of a bit in parity byte 26 will "ripple" or propagate to change parity bytes 38 and 58. Likewise, a change to a bit in parity byte 38 will cause changes to parity byte 58, but, of course, would not impact the lower ranked parity byte 26. Thus, for the standby apparatus to generate frames with correct parity bits, i.e. equal to the parity bits generated by an active apparatus, frame boundaries and the history of the prior parity must be known. The parity bytes generated by the new standby frame must be aligned to reflect the corresponding data history, i.e. avoid the transmission of parity bits which appear to indicate errors in the data to the receiving equipment even though the received data has no errors. An exemplary embodiment of apparatus and an exemplary method in accordance with the present invention which are described below address this transition problem.

Figure 5:
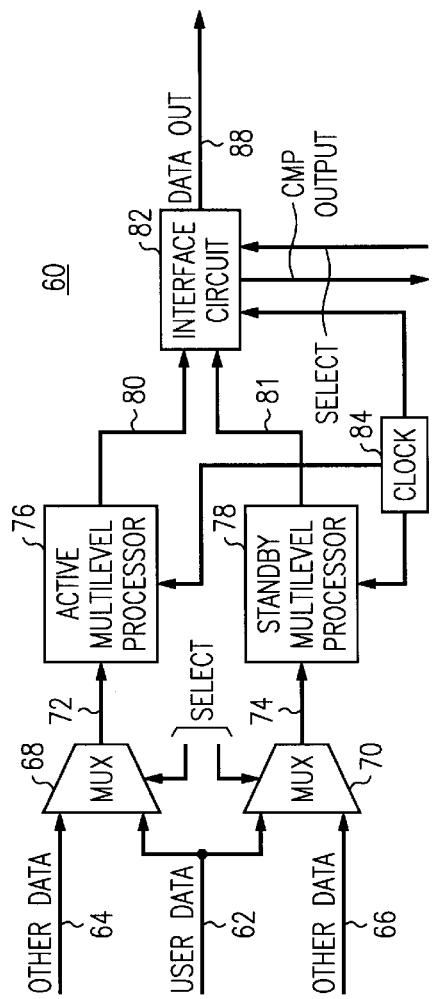
FIG. 5 illustrates a block diagram of an embodiment in accordance with the present invention in which frames including hierarchical parity bits are generated by active and standby processors.

FIG. 5 illustrates a block diagram of a telecommunication apparatus 60 in accordance with an embodiment of the present invention which generates sequential frames of data protected by nested hierarchical parity bits. User data is received on communication channel 62. Other types of data may be received as inputs on communication channels 64 and 66. Selectors (multiplexers) 68 and 70 select one of two inputs to feed via communication channels 72 and 74 to the active multilevel processor 76 and the standby multilevel processor 78, respectively. In the illustrative embodiment it will be understood that the labels "active" and "standby" refer to a given time of operation and that the roles of the multilevel processors can alternate between active and standby. The active label normally designates the multilevel processor which is actively receiving user data, processing the data and transmitting the user data on an output channel to interface circuit 82. The interface circuit receives clock inputs from clock 84 as does the active and standby processors. Interface circuit 82 selects whether to transmit output frames generated by the active or standby processors on output channel 88 to receiving equipment connected to output channel 88.

Each of the processors 76 and 78 may comprise an apparatus such as shown in FIG. 1 which generates or builds frames based on input data. Assume active multilevel processor 76 is receiving user data from channel 62 via selector 68 and channel 72, while standby multilevel processor 78 receives other data from channel 66 by selector 70 and input channel 74. In this condition the processor 76 generates frames carrying the user data which are transmitted to interface circuit 82 which then couples the frames to output 88 for transmission to appropriate receiving apparatus. While this activity proceeds, standby multilevel processor 78 may receive test or maintenance data which is utilized to exercise or test the functions of the processor 78. Processor 78 generates output frames based on the test data and transmits these frames on output channel 81 to interface circuit 82. Interface circuit 82, which will be described in more detail below, selects between one of its inputs to process. In the illustrative example, input 80 is selected to be processed by interface circuit 82 and a resulting output transmitted on channel 88. Input on channel 81 representing the testing of processor 78 is not transmitted by the interface circuit to channel 88, but can be routed to other circuitry associated with such testing (not shown).

Assuming that processor 78 is operating in the standby mode and that it is desired to reverse the modes of the processors, that is, have processor 78 assume the active role while processor 76 assumes the standby role, user data 62 will be selected by both selectors 68 and 70 to provide concurrent inputs on channels 72 and 74 to both processor 76 and 78, respectively, prior to the desired time of transition. In accordance with a preferred, but not exclusive mode of operation of an embodiment of the present invention, user data is routed to the standby processor 78 for a sufficient number of frames before the actual switch over is made to transmit data generated by standby processor 78. In the illustrative example, at least one frame of user data will have been forwarded to and processed by the standby processor 78 prior to the desired frame at which the transition is to occur. This gives the interface circuit 82 time to implement the steps in accordance with the present invention to achieve parity bit alignment so that "correct" parity bits are always transmitted on channel 88. That is, there will be glitchless switching with agreement between data and parity bits for all frames transmitted by interface circuit 82 regardless of the switch from active to passive processing from processor 76 to processor 78.

Figure 6:
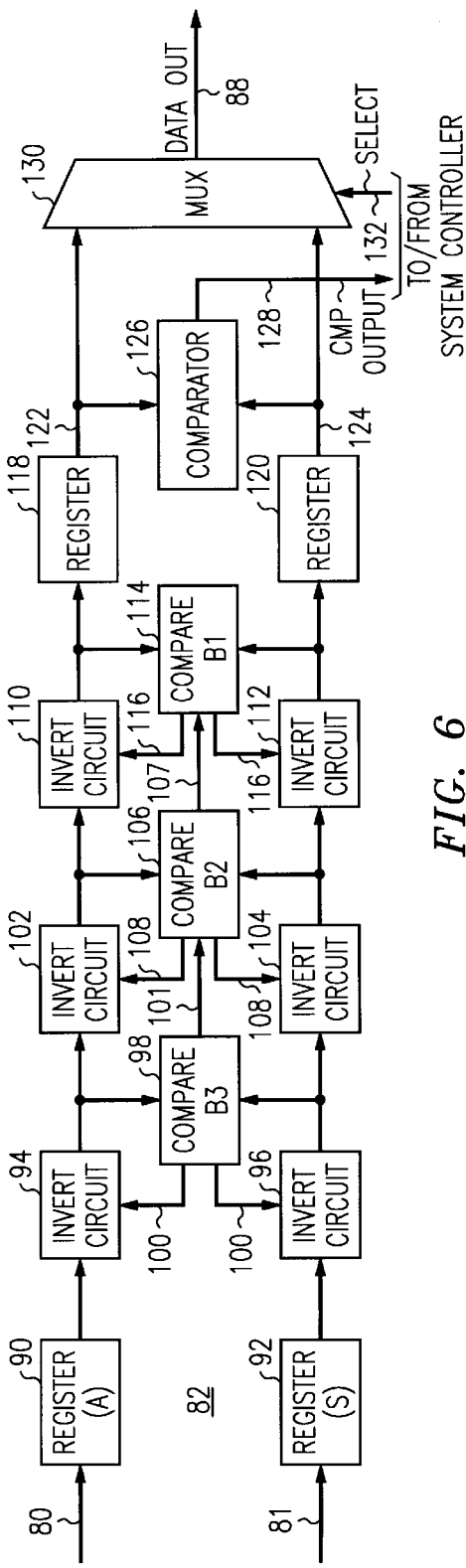
FIG. 6 is a block diagram of an embodiment of the interface circuit as shown in FIG. 5.

FIG. 6 illustrates a block diagram of an interface circuit 82 in accordance with an embodiment of the present invention. Registers 90 and 92 are associated with the active and standby processors 76 and 78, respectively, and receive frames generated from the processors on input channels 80 and 81. Prior to a transition to be made from the currently active processor 76 to the passive processor 78, a first frame of data is generated by both of the processors and transmitted to interface circuit 82 on lines 80 and 81, respectively. Inversion circuits 94 and 96 process these frames stored in registers 90 and 92, respectively. The inversion circuits are used to selectively invert or change the polarity (state) of the lowest rank parity bit 26; the remainder of the frame is unchanged. A comparison circuit 98 compares parity bit 26 of the standby frame with the corresponding parity bit 26 of the corresponding active frame and provides control signals on output lines 100 to the inversion circuits. Comparison circuit 98 sends an output signal on line 100 to inversion circuit 96 to control whether parity bit 26 is to be inverted based upon whether it is equal to the corresponding parity bit in the active side of the same frame. Once this decision has been made, the comparison circuit 98 also transmits the comparison decision by path 101 to comparison circuit 106. In all succeeding frames the inversion circuit 96 will either invert or not invert the parity bit 26 based on the decision made during the current frame by comparison circuit 98. However, once parity bit alignment is attained, the same decision for following frames will continue to be made unless an actual parity error exists. Inversion circuit 94 may have been inverting or not inverting the active side parity bit 26 prior to the first frame; the inversion choice of circuit 94 (the active side) remains unchanged during the active-to-standby changeover.

Figure 7:
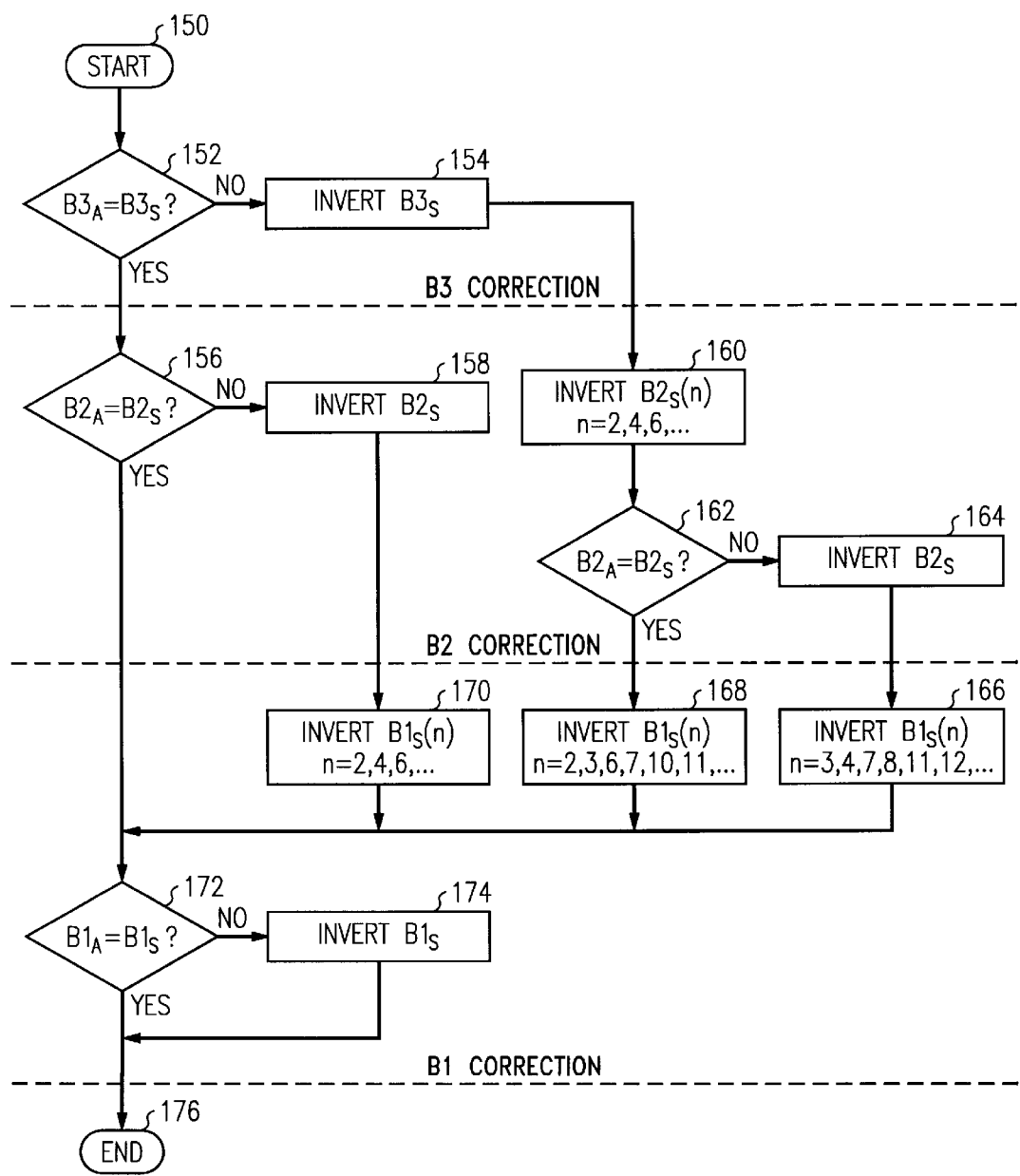
FIG. 7 is a flow diagram of a method in accordance with an embodiment of the present invention illustrating steps utilized to align the hierarchical nested parity bits.

The explanation in accordance with FIG. 6 and the following explanation of the method steps in accordance with FIG. 7 describe a transition and comparisons with regard to a single parity bit as opposed to the parity byte as discussed with regard to FIGS. 1–4. It will be understood that with regard to each bit in the parity byte the same corresponding decisions will be made on a bit-by-bit basis since each parity bit is calculated independent of the other parity bits.

Inversion circuits 102 and 104 receive the frames as processed by inversion circuits 94 and 96, respectively, and store predetermined parity inversion patterns (sequences) which are selected. The inversion circuits 102 and 104 invert or do not invert parity bit 38 depending upon the results of the comparison made by comparison circuit 106 and the prior inversion decision made by comparison circuit 98. The comparison circuit 106 determines whether the parity bit of the second rank (parity bit 38) of the standby frame is equal to the corresponding parity bit 38 in the corresponding active frame. The decisions by circuits 106 and 98 are transmitted on path 107 to comparison circuit 114. The output signals on control lines 108 from comparison circuit 106 are used to control inversion circuits 102 and 104. In the illustrative example, the inversion circuit 104 will receive and implement the inversion or non-inversion sequence as determined by the signal on line 108 from comparison circuit 106 during the current frame. This permits the state of the lower rank parity bit 26 previously determined by comparison circuit 98 and implemented by inversion circuit 96 to be used as part of the inversion determination of each bit in parity byte 38. The state of inversion or non-inversion of bits of the byte 38 by the active side circuit 102 is not changed. Circuits 102 and 104 do not change data in the processed frame except for the parity bits in the byte 38.

Inversion circuits 110 and 112 receive the frames from circuits 102 and 104, respectively, and store predetermined sequences of inversions which are applied during the changeover from the active to standby apparatus. The inversion decision implemented by circuit 112 depends on whether comparison circuit 114 determines if the corresponding standby parity bit 58 is equal to the corresponding parity bit 58 in the active side during the same frame and on prior inversion decisions made by circuits 98 and 106. In accordance with the illustrative embodiment, this determination is implemented by control signals on output lines 116 from comparison circuit. This decision is made for each frame, but as explained above, will not vary once parity bit alignment is achieved. The state of inversion or non-inversion of active side bit 58 by circuit 110 is not changed.

The frame output from inversion circuits 110 and 112 are received as inputs by shift registers 118 and 120 which each store a frame of data. The frame output on lines 122 and 124 from registers 118 and 120, respectively, provide inputs to comparator 126 which provides a bit-by-bit comparison of these frames. The true/false result of the complete frame comparison is provided on output line 128 and provides a means by which a determination is made that the standby side frame is in parity synchronization (alignment) with the active side frame, i.e. all parity bits in the standby side frame are equal to corresponding parity bits in the active side frame prior to making the transition. The frame output on lines 122 and 124 from the registers is also provided as inputs to selector 130 which selects either the active or standby frame of data to be coupled to the data output line 88 from interface circuit 82. A select control signal carried on line 132 determines which of the frames are selected. A system controller (not shown) receives the true/false signal from line 128 and is utilized to provide a control signal on select line 132 which prevents a transition from the active to the passive data stream until a true signal is received on line 128.

Assuming a transition is desired from the active to the passive processor, and assuming that the active processor has not encountered an actual failure, a frame of data is processed by the standby processor 78 in parallel with the active processor 76 in order to enable the comparison circuits 98, 106, and 114 to make decisions as to whether the corresponding standby inversion circuits 96, 104, and 112 are to implement an appropriate inversion sequence of the parity bits 26, 38, and 58, respectively. Thus, in accordance with a preferred embodiment of the present invention, at least one frame is processed prior to the actual transition of transmitting frames processed by the standby processor 78. It will be apparent to those skilled in the art that once a transition has been made from the active processor 76 to passive processor 78, the roles are reversed and the side then selected to provide output frames of information becomes the active side, i.e. processor 76 is then the standby side and processor 78 is the active side. A subsequent active to standby transition causes the decisions made by comparison circuits 98, 106, 114 to result in corresponding inversion decisions to be implemented by the then standby inversion circuits 94, 102, and 110, respectively, while the decisions implemented by circuits 96, 104, and 112 remain unchanged.

FIG. 7 illustrates a flow diagram in accordance with an exemplary embodiment of the present invention which illustrates steps which may be implemented by the apparatus shown in FIG. 6. Beginning at START 150, a determination is made by step 152 of whether the lowest ranked parity bit in the standby side is equal to the corresponding parity bit in the active side, i.e. is $B3_A=B3_S$? Where "B" represents a parity bit, "3" indicates rank, and the subscripts specify A(ctive) or S(tandby) association. As previously explained, the B3 parity bit inversion is first determined. A NO determination by step 152 results in the lowest ranked parity bit on the standby side ($B3_S$) being inverted as indicated in step 154. The decision to invert or not invert the lowest parity bit is made during each frame. In accordance with the exemplary embodiment, the notations B3, B2, and B1 correspond to the lowest, intermediate, and highest ranked parity bits 26, 38, and 58, as shown in FIGS. 2, 3, and 4. It will also be appreciated that the steps described for FIG. 7 are made on a bit by bit basis for each corresponding parity bit of the three parity bytes.

Regarding the correction of B2, a YES decision by determination step 152 leads to a further determination by determination step 156. The determination made by step 156 is whether the parity bit 38 in the standby side is equal to the corresponding parity bit 38 for the same frame in the active side, that is, is $B2_A=B2_S$? A NO determination by step 156 results in step 158 causing an inversion decision for the parity bit 38 ($B2_S$). This decision is stored and implemented, i.e. $B2_S$ is to be inverted. A YES determination by step 156 results in a decision not to invert the second ranked parity bit.

With regard to the correction of B2, if the determination made by step 152 was NO, then an inversion determination for the second ranked parity bit proceeds as follows. Continuing from the inversion of $B3_S$ in step 154, a determination is made in step 160 to apply an inversion sequence to the second order parity bit, wherein the sequence consists of inverting the second ranked parity bit during frames of even number. That is, during frame numbers 2, 4, 6, . . . , the second ranked parity bit 38 ($B2_S(N)$) is inverted; it is not inverted during odd numbered frames. Following step 160, a determination is made in step 162 of whether the second ranked parity bit following the inversion provided in step 160 is equal to the corresponding parity bit in the active side, i.e. is $B2_A=B2_S$? A NO determination by step 162 results in step 164 implementing an inversion to be made of each second parity bit $B2_S$.

With regard to the correction of B1, it will be apparent from FIG. 7 that inversion decisions for the highest ranking or first parity bit 58 ($B1_S$) will be made depending on which of the four decision paths from the correction of B2 is taken.

If step 164 was executed, then the highest parity bit will be inverted in accordance with the sequence determined in step 166 where $B1_S$ is inverted for frame numbers 3, 4, 7, 8, 11, 12, . . . . That is, inversions will be made in pairs of two with non-inversion being made in intermediate pairs of two. This indefinite sequence is continued in accordance with step 166.

In the correction of B1, a YES determination by step will result in the highest rank frame $B1_S$ being inverted in accordance with a frame sequence of 2, 3, 6, 7, 10, 11 . . . , as indicated in step 168. If step 158 was executed, the highest ranked parity bit $B1_S$ will be inverted in accordance with even numbered frames as indicated in step 170. That is, the highest order parity bit $B1_S$ will be inverted during frames 2, 4, 6, . . . .

If the determination step 156 resulted in a YES determination, no preceding inversions of the third or second parity bits will have been initiated. This, as well as steps 166, 168, and 170, leads to a determination in step 172 to make a determination as to whether the highest parity bit in the standby side is equal to the corresponding highest parity bit during the current frame in the active side, i.e. does $B1_A=B1_S$? A NO determination by step 172 results in the highest order parity bit $B1_S$ being inverted in accordance with step 174. A YES determination by step 172 results in the termination of the alignment process at END 176. The inversion decisions made for $B3_S$, $B2_S$, and $B1_S$ are made sequentially and implemented for all frames until the next active-to-standby transition.

In accordance with the illustrative embodiment of FIGS. 1–4 in which 8-bit parity bytes were used, the above actions of FIG. 7 are taken for each of the eight parity bits in each parity byte since each parity bit provides an independent indication of parity for corresponding bit positions in the other data as previously discussed. Thus, for an 8-bit parity byte, the above inversion-determining process will be independently made for each of the 8 bits in the parity bytes.

As described in FIG. 7, steps 160, 166, 168, and 170 involve the implementation of a predetermined bit inversion sequence based on the frame number (position) relative to a first beginning frame. It is believed to be apparent to those skilled in the art that such repeating sequences can be implemented in various ways including state machines, logic circuits, and software processes. In accordance with the preferred embodiment of the present invention, in order to enhance the processing speed, it is preferred that inversion decisions and bit inversions be implemented in hardware. It is believed to be apparent to those skilled in the art that this exemplary technique explained with regard to three levels of priority can be utilized to handle various levels of nested parity bits including parity ranks of 2, 3, and greater than 3.

Inversion Sequences

In the above description in accordance with FIGS. 6 and 7, predetermined inversion sequences of the parity bits are utilized depending upon the comparisons of the standby-to-active parity bits and depending upon the prior history of inversion decisions made with regard to lower ranked parity bits. This section provides an explanation of why the particular inversion patterns defined in steps 160, 166, 168, and 170 are used to achieve parity bit alignment.

These relationships compare the parity calculated by the active and standby apparatus. For these calculations, frame 1 corresponds to the first frame in which the active and standby apparatus are processing equivalent data. The parity inserted in frame 1 by the active and standby sides may be different since the two sides were processing different data prior to frame 1.

In the following expressions the value in parentheses indicates the frame in which the corresponding data or parity bits occur. B3(N+1) is the B3 parity bit 26 inserted in frame N+1, where D3(N) includes all of the corresponding payload 22 and header 24 data bits in subframe 20 of frame N in FIG. 2, except the B3 parity bit, which may be different between the active and standby sides and is shown separately as B3(N). B2(N+1) is the B2 parity bit 38 inserted in frame N+1, where D2(N) includes all of the corresponding payload 22 and header data bits 24 and 26 in subframe 34 of frame N in FIG. 2, except the B3 and B2 parity bits 26 and 38, which may be different between the active and standby sides and are shown separately as B3(N) and B2(N), respectively. Similarly, B1(N+1) is the B1 parity bit 58 inserted in frame N+1, where D1(N) includes all of the corresponding payload 22 and header data bits 24, 36, and 56 in subframe 54 of frame N in FIG. 2, except the B3, B2, and B1 parity bits 26, 38, and 58, which may be different between the active and standby sides and are shown separately as B3(N), B2(N), and B1(N), respectively.

$$B3(N+1)=D3(N)+B3(N)$$

$$B2(N+1)=D2(N)+B3(N)+B2(N)$$

$$B1(N+1)=D1(N)+B3(N)+B2(N)+B1(N)$$

In the following expressions, parity and data corresponding to the active and standby sides are designated by the subscripts $_A$ and $_S$, respectively (e.g. $B3_A, B3_S$).

The following relationships compare the B3 parity calculated and inserted by the active and standby apparatus.

$$\text{ACTIVE SIDE } B3_A(N+1)=D3(N)+B3_A(N)$$

$$\text{SPARE SIDE } B3_S(N+1)=D3(N)+B3_S(N)$$

Note that the header and payload data represented by D3(N) is equivalent for the active and standby sides. Thus:

$$B3_A(N+1)-B3_S(N+1)=B3_A(N)-B3_S(N)$$

The above equation can be further reduced by iteratively substituting for B3 in previous frames.

$$B3(N-1)=D3(N-2)+B3(N-2)$$

$$B3(N)=D3(N-1)+B3(N-1)$$

$$B3(N+1)=D3(N)+B3(N)$$

$$B3(N+1)=D3(N)+D3(N-1)+D3(N-2)+\ldots+D3(1)+B3(1)$$

$$B3_A(N+1)B3_S(N+1) = \left[ \sum_{n=1}^{N} D3(n) + B3_A(1) \right] - \left[ \sum_{n=1}^{N} D3(n) + B3_S(1) \right]$$

$$B3_A(N+1) - B3_S(N+1) = B3_A(1) - B3_S(1)$$

The above calculation shows that the difference in the B3 parity for the active and standby sides is determined by the relationship between the corresponding B3 values in the first frame, i.e. B3A(1) and $B3_S(1)$. There are two conditions which can occur, either $B3_A(1)=B3_S(1)$ or $B3_A(1) \neq B3_S(1)$.

FOR $B3_A(1) = B3_S(1)$: $B3_A(N+1) - B3_S(N+1) = 0$ $B3_A(N+1) = B3_S(N+1)$

FOR $B3_A(1) \ne B3_S(1)$: $B3_A(N+1) - B3_S(N+1) = 1$ $B3_A(N+1) = \overline{B3_S(N+1)}$ Thus, for $B3_A(1)=B3_S$, the $B3_S$ and B3A parity bits will be equal in all subsequent frames. For $B3A(1) \ne B3_S(1)$, $B3_S$ will be the inverse of B3A in all subsequent frames. $B3_S$ can be made equal to B3A by comparing their values in corresponding frames and if not equal introducing an inversion in the parity for the standby side as shown in FIG. 7.

The following relationships compare the B2 parity calculated and inserted by the active and standby apparatus.

ACTIVE SIDE: $B2_A(N+1)=D2(N)+B3_A(N)+B2_A(N)$

SPARE SIDE: $B2_S(N+1)=D2(N)+B3_S(N)+B2_S(N)$

Iteratively substituting for B3 and B2 in previous frames:

$B2(N-1)=D2(N-2)+B3(N-2)+B2(N-2)$ $B2(N)=D2(N-1)+B3(N-1)+B2(N-1)$ $B2(N+1)=D2(N)+B3(N)+B2(N)$ $B2(N+1)=[D2(N)+D2(N-1)+ \ldots +D2(1)]+[B3(N)+B3(N-1)+ \ldots +B3(1)]+B2(1)$ $$B2_A(N+1) - B2_S(N+1) = \left[\sum_{n=1}^{N} B3_A(n) + B2_A(1)\right] - \left[\sum_{n=1}^{N} B3_S(n) + B2_S(1)\right] \quad \text{EQ 1}$$

To solve for B2 in EQ 1, the cases must be considered for which $B3_A=B3_S$ and $B3_A \ne B3_S$.

FOR $B3_A=B3_S$: $B2_A(N+1)-B2_S(N+1)=B2_A(1)-B2_S(1)$

FOR $B2_A(1)=B2_S(1)$: $B2_A(N+1)=B2_S(N+1)$

FOR $B2_A(1) \ne B2_S(1)$: $B2_A(N+1)=\overline{B2_S(N+1)}$

Thus, for $B3_A(1)=B3_S(1)$, the relationship between $B2_S$ and $B2_A$ is dependent on the relationship between $B2_A(1)$ and $B2_S(1)$. For $B2_A(1)=B2_S(1)$, the $B2_S(1)$ and $B2_A$ parity bits will be equal in all subsequent frames. For $B2_A(1) \ne B2_S(1)$, $B2_S$ will be the inverse of $B2_A$ in all subsequent frames.

FOR $B3_A \ne B3_S$:

FOR $N$ EVEN: $\sum_{n=1}^{N} B3_A(N) - \sum_{n=1}^{N} B3_S(N) = 0$

FOR $N$ ODD: $\sum_{n=1}^{N} B3_A(N) - \sum_{n=1}^{N} B3_S(N) = 1$

Substituting the above relationships into EQ 1:

FOR $N$ EVEN: $B2_A(N+1)-B2_S(N+1)=B2_A(1)-B2_S(1)$

Note that the above relationship is the same as for the case when $B3_A=B3_S$. Thus, for $B3_A \ne B3_S$ and N even, $B2_S$ will either equal $B2_A$ or be the inverse, depending on whether $B2_A(1)=B2_S(1)$ or $B2_A(1) \ne B2_S(1)$, respectively.

FOR $N$ ODD: $B2_A(N+1) - B2_S(N+1) =$ $B2_A(1) - B2_S(1) + 1 = \overline{B2_A(1) - B2_S(1)}$ FOR $B2_A(1) = B2_S(1)$: $B2_A(N+1) = \overline{B2_S(N+1)}$ FOR $B2_A(1) \ne B2_S(1)$: $B2_A(N+1) = B2_S(N+1)$ The above relationship shows that for $B3_A \ne B3_S$ and N odd, $B2_S$ will either be the inverse of $B2_A$ or equal to $B2_A$, depending on whether $B2_A(1)=B2_S(1)$ or $B2_A(1) \ne B2_S(1)$, respectively. This relationship taken together with the previous relationship for N even shows that the relationship between $B2_S$ and $B2_A$ for $B3_A \ne B3_S$ is the opposite for odd and even frames. This difference can be accounted for by inverting $B2_S$ in every other frame as shown in FIG. 7, after which $B2_S$ will either equal $B2_A$ or its inverse in every frame.

The following relationships compare the B1 parity calculated and inserted by the active and standby apparatus.

$B1_A(N+1)=D1(N)+B3_A(N)+B2_A(N)+B1_A(N)$ $B1_S(N+1)=D1(N)+B3_S(N)+B2_S(N)+B1_S(N)$

Iteratively substituting for B3, B2, and B1 in previous frames:

$B1(N-1)=D1(N-2)+B3(N-2)+B2(N-2)+B1(N-2)$ $B1(N)=D1(N-1)+B3(N-1)+B2(N-1)+B1(N-1)$ $B1(N+1)=D1(N)+B3(N)+B2(N)+B1(N)$ $B1(N+1) = \sum_{n=1}^{N} D1(n) + \sum_{n=1}^{N} B3(n) + \sum_{n=1}^{N} B2(n) + B1(1)$ $B2(n) = \sum_{m=1}^{n-1} D2(m) + \sum_{m=1}^{n-1} B3(m) + B2(1)$ $\sum_{n=1}^{N} B2(n) = \sum_{n=1}^{N} \left( \sum_{m=1}^{n-1} D2(m) + \sum_{m=1}^{n-1} B3(m) + B2(1) \right)$ $\sum_{n=1}^{N} B2(n) = \sum_{n=1}^{N} \sum_{m=1}^{n-1} D2(m) + \sum_{n=1}^{N} \sum_{m=1}^{n-1} B3(m) + (B2(1) \times N)$ $B1_A(N+1) = \sum_{n=1}^{N} D1(n) + \sum_{n=1}^{N} B3_A(n) + \sum_{n=1}^{N} \sum_{m=1}^{n-1} D2(m) +$ $\sum_{n=1}^{N} \sum_{m=1}^{n-1} B3_A(m) + (B2_A(1) \times N) + B1_A(1)$ $B1_S(N+1) = \sum_{n=1}^{N} D1(n) + \sum_{n=1}^{N} B3_S(n) + \sum_{n=1}^{N} \sum_{m=1}^{n-1} D2(m) +$ $\sum_{n=1}^{N} \sum_{m=1}^{n-1} B3_S(m) + (B2_A(1) \times N) + B1_S(1)$ $B1_A(N+1) - B1_S(N+1) =$ $\left[ \sum_{n=1}^{N} B3_A(n) + \sum_{n=1}^{N} \sum_{m=1}^{n-1} B3_A(m) + (B2_A(1) \times N) + B1_A(1) \right] -$ $\left[ \sum_{n=1}^{N} B3_S(n) + \sum_{n=1}^{N} \sum_{m=1}^{n-1} B3_S(m) + (B2_S(1) \times N) + B1_S(1) \right]$ $B1_A(N+1) - B1_S(N+1) = \sum_{n=1}^{N} [B3_A(n) - B3_S(n)] +$ $$\sum_{n=1}^{N} \left\{ \sum_{m=1}^{n=1} [B3_A(m) - B3_S(m)] \right\} + \quad \text{EQ 2}$$

$$(B2_A(1) - B2_S(1)) \times N + B1_A(1) - B1_S(1)$$

To solve for B1, the following cases must be considered:
Case 1: $B3_A = B3_S$ and $B2_A B2_S$;
Case 2: $B3_A = B3_S$ and $B2_A \neq B2_S$;
Case 3: $B3_A \neq B3_S$ and $B2_A = B2_S$;
Case 4: $B3_A \neq B3_S$ and $B2_A \neq B2_S$.

FOR $B3_A = B3_S$:

$$B1_A(N+1) - B1_S(N+1) = (B2_A(1) - B2_S(1)) \times N + B1_A(1) - B1_S(1)$$

CASE 1:

FOR $B2_A = B2_S$:

$$B1_A(N+1) - B1_S(N+1) = B1_A(1) - B1_S(1)$$

Thus,

If $B1_A(1) = B1_S$ then $B1_A(N+1) = B1_S(N+1)$

If $B1_A(1) \neq B1_S(1)$ then $B1_A(N+1) = \overline{B1_S(N+1)}$

Thus, for Case 1:
If $B1_A(1) = B1_S(1)$, the $B1_S$ and $B1_A$ parity bits will be equal in all subsequent frames. If $B1_A(1) \neq B1_S(1)$, $B1_S$ will be the inverse of $B1_A$ in all subsequent frames.

CASE 2:

FOR $B2_A \neq B2_S$:

For $N$ even:

If $B1_A(1) = B1_S(1)$ then $B1_A(N+1) = B1_S(N+1)$

If $B1_A(1) \neq B1_S(1)$ then $B1_A(N+1) = \overline{B1_S(N+1)}$

FOR $N$ ODD:

$$B1_A(N+1) - B1_S(N+1) = 1 + B1_A(1) - B1_S(1)$$

If $B1_A(1) = B1_S(1)$ then $B1_A(N+1) = \overline{B1(N+1)}$

If $B1_A(1) \neq B1_S(1)$ then $B1_A(N+1) = B1_S(N+1)$

Thus, for Case 2:
For N even, if $B1_A(1) = B1_S(1)$, the $B1_S$ and $B1_A$ parity bits will be equal in subsequent frames. If $B1_A(1) \neq B1_S(1)$, $B1_S$ will be the inverse of $B1_A$ in subsequent frames.
For N odd, if $B1_A(1) = B1_S(1)$, $B1_S$ will be the inverse of $B1_A$ in subsequent frames. If $B1_A(1) \neq B1_S(1)$, the $B1_S$ and $B1_A$ parity bits will be equal in subsequent frames.

FOR $B3_A \neq B3_S$:

$$\begin{cases} \sum_{n=1}^{N} [B3_A(n) - B3_S(n)] = 0 \text{ for } N \text{ EVEN} \\ \sum_{n=1}^{N} [B3_A(n) - B3_S(n)] = 1 \text{ for } N \text{ ODD} \end{cases} \quad \text{EQ 3}$$

$$\sum_{n=1}^{N} \left\{ \sum_{m=1}^{n-1} [B3_A(m) - B3_S(m)] \right\} = \sum_{n=1}^{N} \sum_{m=1}^{n-1} 1$$

$$\sum_{n=1}^{N} \left\{ \sum_{m=1}^{n-1} [B3_A(m) - B3_S(m)] \right\} = \sum_{n=1}^{N} (n-1)$$

$$\begin{cases} \sum_{n=1}^{N} \left\{ \sum_{m=1}^{n-1} [B3_A(m) - B3_S(m)] \right\} = \\ \frac{N(N-1)}{2} = 0 \text{ for } N = 1, 4, 5, 8, 9, 12, 13, \ldots \\ \sum_{n-1}^{N} \left\{ \sum_{m=1}^{n-1} [B3_A(m) - B3_S(m)] \right\} = \\ \frac{N(N-1)}{2} = 1 \text{ for } N = 2, 3, 6, 7, 10, 11, \ldots \end{cases} \quad \text{EQ 4}$$

Substituting the values for B3 given in Eqs 3 and 4 into EQ 2:

$$B1_A(N+1) - B1_S(N+1) = [B2_A(1) - B2_S(1)] \times N +$$

$$B1_A(1) - B1_S(1); \text{ for } N = 3, 4, 7, 8, \ldots = [B2_A(1) - B2_S(1)] \times$$

$$N + B1_A(1) - B1_S(1) + 1; \text{ for } N = 1, 2, 5, 6, \ldots$$

CASE 3:

FOR $B2_A = B2_S$:

$$B1_A(N+1) - B1_S(N+1) = B1_A(1) - B1_S(1); \text{ for } N = 3, 4, 7, 8, \ldots =$$

$$\overline{B1_A(1) - B1_S(1)}; \text{ for } N = 1, 2, 5, 6, \ldots$$

$$B1_A(1) = B1_S(1): B1_A(N+1) = B1_S(N+1); N = 3, 4, 7, 8, \ldots$$

$$B1_A(N+1) = \overline{B1_S(N+1)}; N = 1, 2, 5, 6, \ldots$$

$$B1_A(1) \neq B1_S(1): B1_A(N+1) = \overline{B1_S(N+1)}; N = 3, 4, 7, 8, \ldots$$

$$B1_A(N+1) = B1_S(N+1); N = 1, 2, 5, 6, \ldots$$

Thus, for Case 3:
For $B1_A(1) = B1_S(1)$, $B1_S$ will be equal to $B1_A$ in frames 4,5,8,9, . . . and the inverse of B1A in frames 2,3,6,7 . . . .
For $B1_A(1) \neq B1_S(1)$, $B1_S$ will be the inverse of $B1_A$ in frames 4,5,8,9, . . . and equal to $B1_A$ in frames 2,3,6,7, . . .

CASE 4:

FOR $B2_A \neq B2_S$:

FOR $N$ EVEN: $[B2_A(1) - B2_S(1)] \times N = 0$ $B1_A(N+1) - B1_S(N+1) \quad = B1_A(1) - B1_S(1); \quad$ for $N = 4, 8, 12, \ldots$
$\quad = \overline{B1_A(1) - B1_S(1)}; \quad$ for $N = 2, 6, 10, \ldots$ FOR $N$ ODD: $[B2_A(1) - B2_S(1)] \times N = 1$ $B1_A(N+1) - B1_S(N+1) \quad = \overline{B1_A(1) - B1_S(1)}; \quad$ for $N = 3, 7, 11, \ldots$
$\quad = B1_A(1) - B1_S(1); \quad$ for $N = 1, 5, 9, \ldots$ $B1_A(1) = B1_S(1): B1_A(N+1) = B1_S(N+1); N = 1, 4, 5, 8, 9, \ldots$ $B1_A(N+1) = \overline{B1_S(N+1)}; N = 2, 3, 6, 7, 10, 11, \ldots$ $B1_A(1) \neq B1_S(1): B1_A(N+1) = \overline{B1_S(N+1)}; N = 1, 4, 5, 8, 9, \ldots$ $B1_A(N+1) = B1_S(N+1); N = 2, 3, 6, 7, 10, 11, \ldots$ Thus, for Case 4:
For $B1_A(1) = B1_S(1)$, $B1_S$ will be equal to $B1_A$ in frames 2,5,6,9,10, . . . and the inverse of $B1_A$ in frames 3,4,7,8,11,12 . . . .
For $B1_A(1) \neq B1_S(1)$, $B1_S$ will be the inverse of $B1_A$ in frames 2,5,6,9,10, . . . and equal to $B1_A$ in frames 3,4,7,8, 11,12, . . . .

The differences between $B1_S$ and $B1_A$ as determined for Cases 1–4 can be accounted for by introducing the appropriate inversions in $B1_S$ as shown in FIG. 7.

Although an embodiment of the present invention has been shown in the drawings and described in the above description, the scope of the invention is defined by the claims which follow.

The invention claimed is:

1. In a telecommunication apparatus having first and second processing devices where the first device processes sequential frames of data in an active mode and the second device operates in a standby mode ready to take over the processing of the frames of data from the first device, each of the sequential frames of data including a plurality of hierarchical generated parity bits, a method for aligning the parity bits during a change of processing of the frames of data from the first device to the second device comprising the steps of:

(a) determining whether the lowest rank parity bit in a first frame of data processed by the second device has the same polarity as the lowest rank parity bit processed by the first device during the first frame;

(b) inverting the polarity of the lowest rank parity bit in the first frame of data processed by the second device if its polarity is not the same as the polarity of the corresponding parity bit processed by the first device during the first frame;

(c) for parity bits processed by the second device, determining for each parity bit of a higher rank than the lowest rank parity bit if a polarity inversion of a lower ranked parity bit has occurred;

(d) if the determination of step (c) is true for a one of the higher rank parity bits, selecting one inversion sequence from a set of inversion sequences to control inversions of the parity of said one parity bit, said selection of the one inversion sequence based on the number of inversions of lower rank parity bits.

2. The method according to claim 1 wherein step (d) further comprises the step of said selection of said one inversion sequence also based on whether the polarity of said one parity bit processed by the second device is not the same as the polarity of the corresponding parity bit processed by the first device.

3. The method according to claim 1 further comprising a step following step (d) of claim 1 of determining whether the highest rank parity bit in a frame of data processed by the second device has the same polarity as the highest rank parity bit processed by the first device during the corresponding frame, and inverting the polarity of the highest rank parity bit in the frame of data processed by the second device if its polarity is not the same as the polarity of the corresponding parity bit processed by the first device during the corresponding frame.

4. The method according to claim 1 wherein said hierarchical parity bits are nested.

5. The method according to claim 1 further comprising the step of the second device sequential frames of data following the first frame of data and aligning the parity bits in the data for each frame.

6. The method according to claim 1 wherein said first and second devices process synchronous formatted data.

7. The method according to claim 1 further comprising the step of said second device beginning to process the frames of data with said first frame of data, and where the second device does not have access to prior history of the state of the parity bits for data previously processed by the first device.

8. The method according to claim 1 further comprising the steps of first and second data streams of the frames of data being generated by the first and second devices, respectively, an output data stream being selected from the first and second data streams, selecting the second data stream as the output data stream only after all ranked parity bits in frames of data in the second data stream have been aligned to be the same as corresponding parity bits in frames of data in the first data stream.

9. In a telecommunication apparatus having first and second processing devices where the first device processes sequential frames of data in an active mode and the second device operates in a standby mode ready to take over the processing of the frames of data from the first device, each of the sequential frames of data including a plurality of hierarchical generated parity bits, the improvement of aligning the parity bits during a change of processing of the frames of data from the first device to the second device comprising:

(a) first means for determining whether the lowest rank parity bit in a first frame of data processed by the second device has the same polarity as the lowest rank parity bit processed by the first device during the first frame;

(b) means responsive to said first means for inverting the polarity of the lowest rank parity bit in the first frame of data processed by the second device if its polarity is not the same as the polarity of the corresponding parity bit processed by the first device during the first frame;

(c) second means for determining if a polarity inversion of a lower ranked parity bit has occurred for each parity bit of a higher rank than the lowest rank parity bit;

(d) means for selecting one inversion sequence from a set of inversion sequences to control inversions of the parity of said one parity bit if the determination of said second determining means is true for one of the higher rank parity bits, said selecting means making the selection based on the number of inversions of lower rank parity bits.

10. The apparatus according to claim 9 wherein said selecting means further comprises selecting said one inversion sequence based on whether the polarity of said one parity bit processed by the second device is not the same as the polarity of the corresponding parity bit processed by the first device.

11. The apparatus according to claim 9 further comprising means for determining whether the highest rank parity bit in a frame of data processed by the second device has the same polarity as the highest rank parity bit processed by the first device during the corresponding frame, and means for inverting the polarity of the highest rank parity bit in the frame of data processed by the second device if its polarity is not the same as the polarity of the corresponding parity bit processed by the first device during the corresponding frame.

12. The apparatus according to claim 9 wherein said hierarchical parity bits are nested.

13. The apparatus according to claim 9 further comprising means for processing sequential frames of data following the first frame of data in order to align the parity bits in the data processed by the second device with the parity bits in the data processed by the first device.

14. The apparatus according to claim 9 wherein said first and second devices process synchronous formatted data.

15. The apparatus according to claim 9 wherein said second device begins processing the frames of data with said first frame of data, and wherein the second device does not have access to prior history of the state of the parity bits for data previously processed by the first device.

16. The apparatus according to claim 9 wherein first and second data streams of the frames of data are generated by the first and second devices, respectively, and further comprising means for generating an output data stream being selected from the first and second data streams, said output generating means selecting the second data stream as the output data stream only after all ranked parity bits in frames of data in the second data stream have been aligned to be the same as corresponding parity bits in frames of data in the first data stream.

17. A telecommunication apparatus adapted to receive first and second streams of data where the first and second streams of data include frames of data with each frame having hierarchical generated parity bits, the apparatus comprising:

means for comparing hierarchical parity bits of equal rank in corresponding frames of data in said first and second streams of data;

means coupled to said comparing means for inverting the polarity of ones of the parity bits in the second stream when: (a) the polarity of said ones are not equal to the corresponding polarity of a parity bit of equal rank in the first data stream, and (b) the polarity of a lower rank parity in the second data stream has been inverted as a result of condition (a), said inverting means selecting ones of predetermined inversion sequences dependent upon conditions (a) and (b).

18. The apparatus according to claim 17 further comprising another means coupled to said inverting means for comparing at least the polarity of all equal rank parity bits in a corresponding frame of data in the first and second streams of data, and means coupled to said another means for routing the second data stream to an output only if the results of the comparison by said another means indicates that all of the equal rank parity bits in the first and second streams of data have the same polarity.

19. In a telecommunication system that receives first and second streams of data where the first and second streams of data includes frames of data having hierarchical parity bits, the system transmitting one of the first and second streams of data, a method for preventing parity mismatch when changing from transmitting the one to the other of the first and second streams of data comprising the steps of:

comparing hierarchical parity bits of equal rank in corresponding frames of data in said first and second streams of data;

selectively inverting the polarity of ones of the parity bits in the second stream of data based on said comparing step in order prevent an interframe mismatch of the polarity of the hierarchical parity bits in the second data stream relative to the hierarchical parity bits in the first data stream.

20. The method according to claim 19 wherein the comparing and selectively inverting steps are performed prior to the change from transmitting the one to the other of the first and second streams of data, and the hierarchical parity bits are nested.

* * * * *